United States Patent [19]

Kawabe et al.

[11] Patent Number: 5,278,983

[45] Date of Patent: Jan. 11, 1994

[54] BOUNDARY REPRESENTATION SOLID MODELING SYSTEM

[75] Inventors: Shinji Kawabe, Kawasaki; Hiroshi Masuda, Tokyo; Kenji Shimada, Kawasaki, all of Japan

[73] Assignee: International Business Machines Corporation, Armonk, N.Y.

[21] Appl. No.: 957,461

[22] Filed: Oct. 5, 1992

Related U.S. Application Data

[63] Continuation of Ser. No. 412,245, Sep. 25, 1989, abandoned.

[30] Foreign Application Priority Data

Sep. 30, 1988 [JP] Japan .................... 63-244499

[51] Int. Cl.$^5$ .................... G06F 15/62
[52] U.S. Cl. .................... 395/120; 395/600; 395/100; 364/920.8; 364/227.3; 364/237.2; 364/DIG. 1; 345/203
[58] Field of Search ............... 395/135, 119, 120, 124, 395/125, 600; 340/798, 799

[56] References Cited

U.S. PATENT DOCUMENTS

| | | | |
|---|---|---|---|
| 3,889,107 | 6/1975 | Sutherland | 395/121 |
| 4,538,225 | 8/1985 | Banks et al. | 364/200 |
| 4,649,498 | 3/1987 | Kedem et al. | 395/120 |
| 4,694,404 | 9/1987 | Meagler | 395/121 |
| 4,736,306 | 4/1988 | Christensen et al. | 395/120 |
| 4,766,556 | 8/1988 | Arakawa | 395/124 |
| 4,821,214 | 4/1989 | Sederberg | 395/120 |
| 4,858,149 | 8/1989 | Quarendon | 395/119 |
| 4,888,583 | 12/1989 | Ligocki et al. | 395/120 |
| 4,890,242 | 12/1989 | Sinha et al. | 395/119 |
| 4,987,554 | 1/1991 | Kaufman | 395/141 |
| 4,992,962 | 2/1991 | Ishida et al. | 395/121 |
| 5,014,230 | 5/1991 | Sinha et al. | 364/900 |
| 5,038,302 | 8/1991 | Kaufman | 395/124 |
| 5,067,087 | 11/1991 | Seki et al. | 395/135 |
| 5,086,495 | 2/1992 | Gray et al. | 395/124 |
| 5,207,292 | 6/1991 | Rossignac et al. | 395/164 |

OTHER PUBLICATIONS

Baumgart, B. G., "A Polyhedron Representation for Computer Vision" *AFIPS Conf. Proc.*, vol. 44, 1975 NCC, pp. 589-596.

Mantyla, M. et al., "GWB: A Solid Model with the Euler Operators" *IEEE Computer Graphics*, vol. 2, No. 7, Sep., 1982, pp. 17-31.

Weiler, K. "Non-Manifold Geometric Modeling" Extended Abstract for *IFIP 5.2 Workshop on Solid Modeling*, 1986.

*Primary Examiner*—Thomas C. Lee
*Assistant Examiner*—Peter Y. Wang
*Attorney, Agent, or Firm*—Marc D. Schechter

[57] ABSTRACT

A solid modeling system for combining a plurality of geometric model elements to form a whole model. The whole model is represented as a collection of non-manifold boundary elements. A data file maintains a record of the correspondence between each non-manifold boundary element and each geometric model element of the whole model, to permit easy and fast modification of the whole model.

3 Claims, 14 Drawing Sheets

VOLUME
FIG. 6A

FACE
FIG. 6B

EDGE
FIG. 6C

VERTEX
FIG. 6D

FIG. 7A

FIG. 7B
NON-MANIFOLD
UNION SET

UNION SET
FIG. 7C

UNION SET    DIFFERENCE SET    INTERSECTION SET

BOUNDARY REPRESENTATION SOLID MODELING SYSTEM

This is a continuation of application Ser. No. 412,245, filed Sep. 25, 1989 now abandoned.

BACKGROUND OF THE INVENTION

This invention relates to a boundary representation (B-rep) solid modeling system, and, more particularly, to a solid modeling system that enables easy building of a solid model through a trial-and-error approach because set operations previously performed can be rapidly deleted or modified.

The solid modeling system is utilized for a design of a product or simulation in the field of design and production, to which the invention can be applied.

A solid model means a three-dimensional model of an object in a computer.

Figure 3:
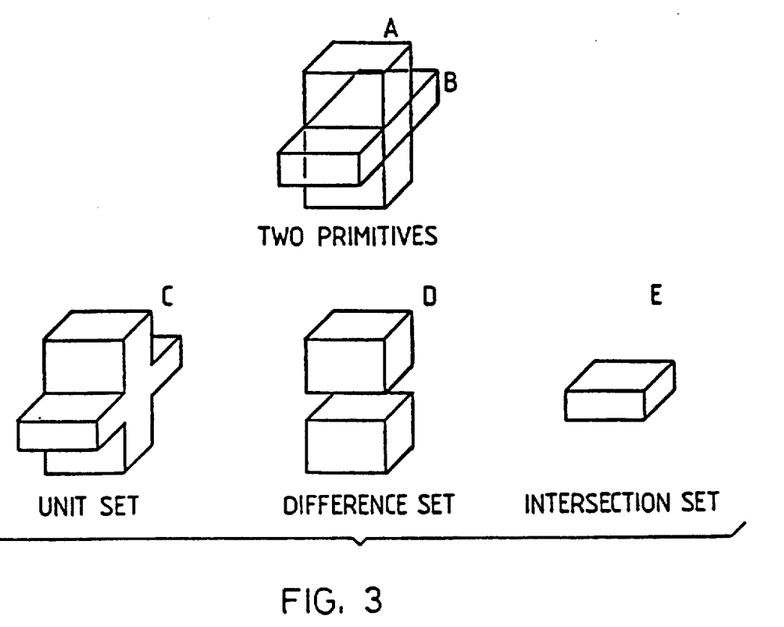
FIG. 3 is a diagram showing an example of set operations.

Set operation is widely used as a means for building a solid model. Set operation is a general term for an operation to obtain a union set, a difference set or an intersection set as shown in FIG. 3. A final definition of a geometric model is performed through appropriate set operations on models predefined by a system that are called primitives.

In an application such as product design, it is necessary to build a solid model through a trial-and-error approach. To this end, it is necessary to provide functions that can recover a geometric model by cancelling a modification operation already performed, and to rework the operation. Techniques, which are currently employed to implement such functions, are discussed by exemplifying two typical internal representations of a solid model, that is, CSG (constructive solid geometry) representation and B-rep.

Figure 4:
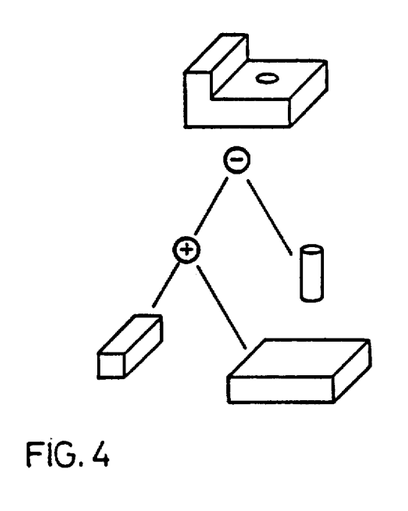
FIG. 4 is a diagram illustrating the CSG representation.

The CSG representation is a representation of what space a desired model occupies by positioning primitives such as a parallelpiped and a cylinder in a space. The geometric model can be represented by a logical binary tree structure of the primitives as shown in FIG. 4.

Figure 5:
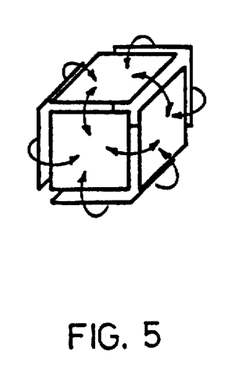
FIG. 5 is a diagram illustrating the boundary representation.
Figure 6A:
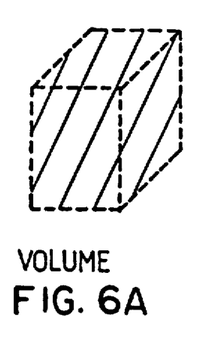
FIGS. 6A, 6B, 6C and 6D are diagrams illustrating elements.
Figure 6B:
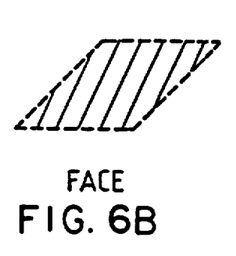
Figure 6C:
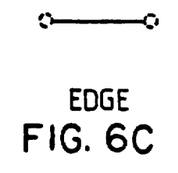
Figure 6D:
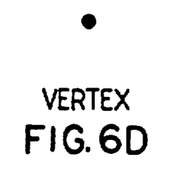

A geometric model can be easily reshaped because it is necessary only to replace the shapes or positions of the primitives in the binary tree structure, or to rewrite the logical operation. However, the CSG representation has only the logical operations upon the primitives, but does not positively manage boundary data such as what volume is built or what edge is produced as the result of the operation. Many applications require such boundary data, so that, in many cases, calculation is performed consequently to obtain a B-rep from the CSG representation. Therefore, the CSG representation has a problem that many applications cannot directly utilize the boundary data although reshaping or reworking can be easily performed. On the other hand, as shown in FIG. 5, the B-rep represents a volume by relations of connections among elements such as vertexes, edges and faces constituting a geometric model. In the B-rep, when the set operation is applied to two volumes, a new volume is generated. By further processing the resultant new volume, a final geometric model is built. Although such execution of the set operation is similar to that in the CSG representation, a model of the boundary representation retains new boundary data of the result of the set operation as data representing the volume.

To reshape a geometric model in the B-rep, there are two following methods:

(1) Execute modification operations all over again.

(2) Describe a modification operation in an Euler operation, and reshape a geometric model backward by applying reverse operations.

The method (1) is, in correcting the volume, to discard the geometric model being built until that moment, and to execute the operations all over again. To this end, the CSG representation is generally retained as the history of the operations generating the B-rep. Then, a new geometric model is rebuilt by referring to and modifying the CSG representation. However, this method takes much time of calculation because, even if a minor modification is to be made, the amount of processing becomes enormous.

On the other hand, the method (2) defines all operations for modifying a geometric model such as set operations as a macro of basic operations called "Euler operations," and backtracks the course of the modification by utilizing the reversibility of the basic operations. This method appears in publications such as:

M. Mantyla and R. Sulonen, "GWB: A Solid Modeler with the Euler Operators," IEEE Computer Graphics, Vol. 2, No. 7, September, 1982, pp. 17-31.

B. G. Baumgart, "A Polyhedron Representation for Computer Vision,"AFIPS Conf. Proc., Vol. 44, 1975 NCC, pp. 589-596.

The Euler operation is a modification operation used to create a new face by adding edges for example, which maintains the relation of the Euler-Poincare equation:

$$v-e+f=2(s-h)+r,$$

where v is the number of vertices, e is the number of edges, f is the number of faces, s is the number of shells, h is the number of thruholes, and r is the number of rings (holes in a face).

The Euler operation always accompanies a reverse operation, and an operation described as a macro of a combination of Euler operations can be recovered by backtracking the history of the operations.

In this case, the time required for reworking operations depends on the order of the operation to be reworked. It is easy to return to the state immediately before the operation even if the number of operations increases. But if it is desired to rework an operation performed in an early stage, it is necessary to backtrack to that point through the reverse operations. That is, it is necessary to perform reverse operations of the operations not relating to reworking, and then to return to the current point after completion of the intended reworking by forward operations, which is very time-consuming.

The conventional methods require the solid model to be rebuilt all over again, or the operations to be backtracked sequentially to recover the previous geometric model even if, during building of the solid model, it is intended to modify a part of the model by cancelling the set operations already executed, which requires an enormous amount of calculation.

According to the invention, the calculation time required for cancellation or reworking of the set operation does not depend on the order of the set operation. Therefore, the set operation executed at any given time can be rapidly reworked.

SUMMARY OF THE INVENTION

A model to be inputted for a set operation may be either a primitive or a geometric model generated from set operations on primitives. Here, a primitive is typically a three-dimensional volume, but may be a two-dimensional line.

Figure 1:
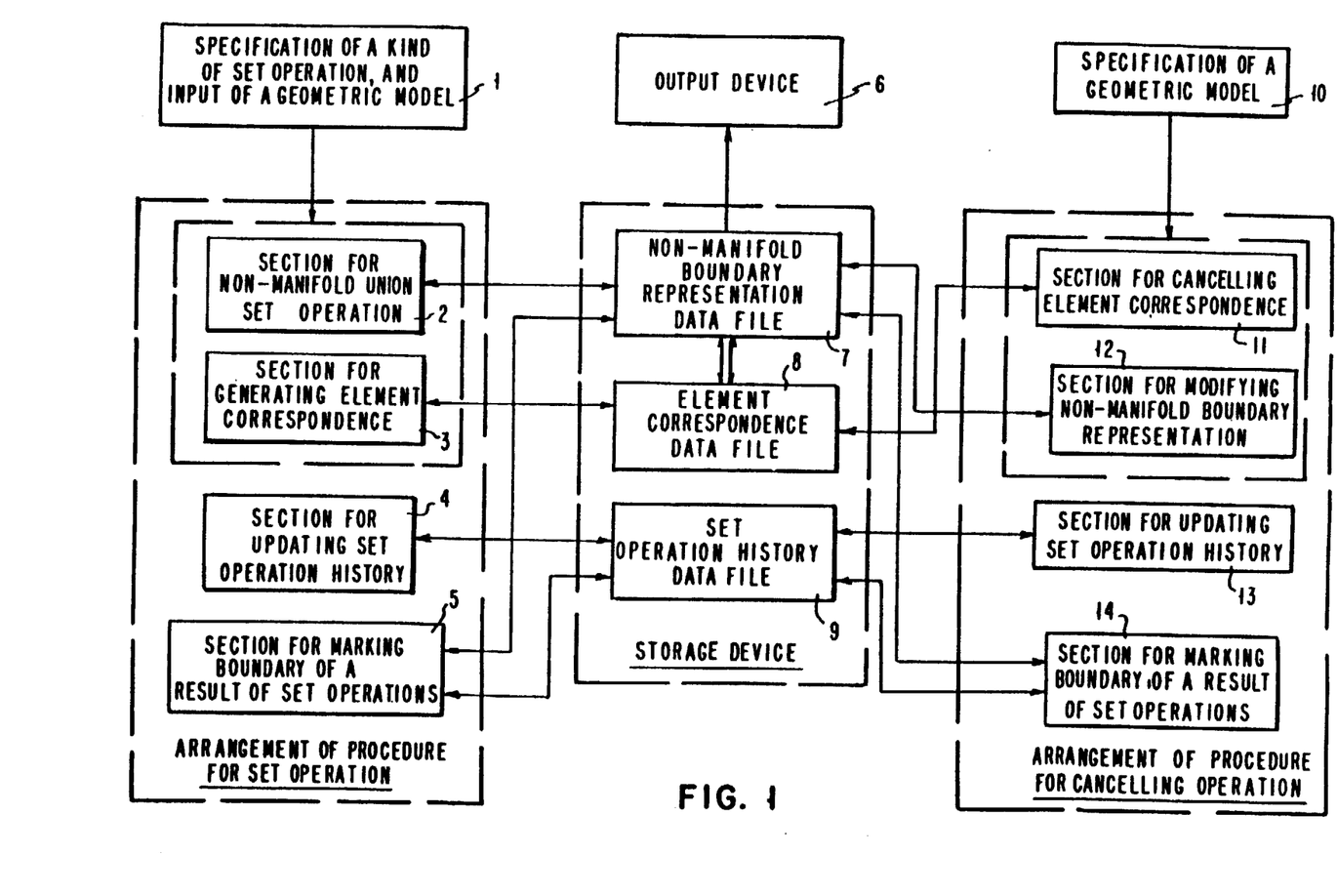
FIG. 1 is a block diagram showing the entire arrangement of the invention.
Figure 2:
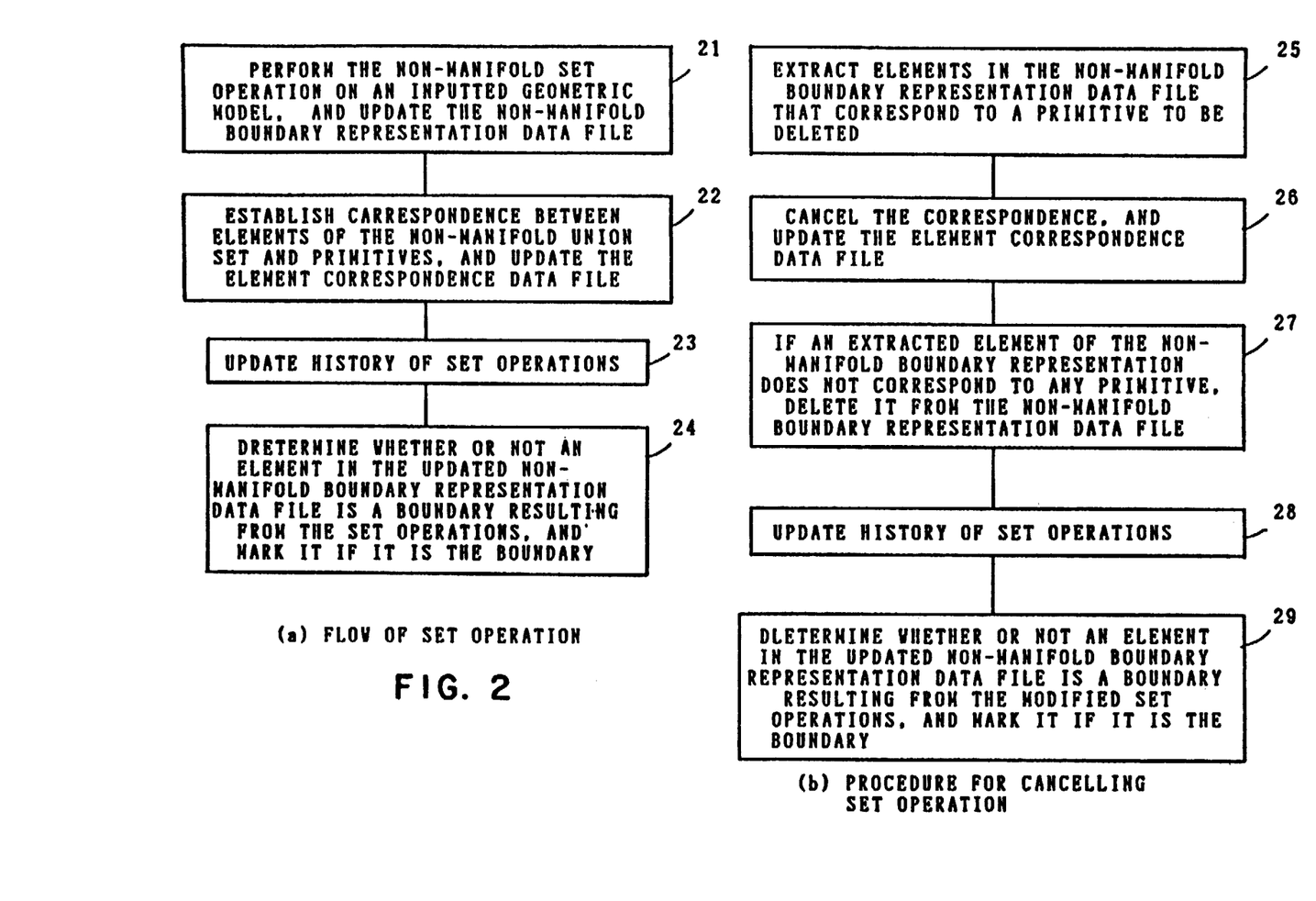
FIG. 2 is a process flowchart.

As seen from FIGS. 1 and 2, according to the invention a non-manifold union set operation is executed on the inputted geometric model to update a non-manifold boundary representation data file (blocks 1, 2, and 21). Non-manifold boundary representation means data which can represent not only a manifold, but also a non-manifold (e.g. one edge shared by more than two faces). Mathematically speaking, the representation space corresponds to a Euclidean Cell Complex.

Figure 7A:
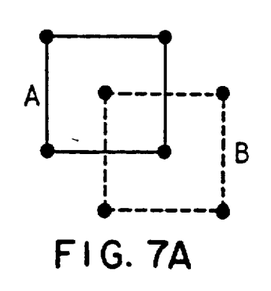
FIGS. 7A, 7B, 7C and 8A, 8B are diagrams showing examples of non-manifold union sets.
Figure 7B:
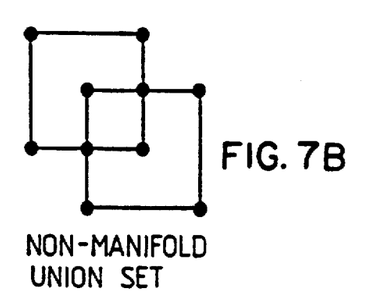
Figure 7C:
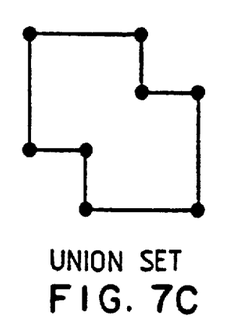

In the following, volumes, faces, edges and vertices are considered to be elements,, The elements are shown in FIGS. 6A to 6D. A non-manifold union set operation means an operation which retains model elements which are contained in a space that the inputted geometric models commonly occupy. FIGS 7A to 7C show a comparison between an example of the non-manifold union set operation on geometric models A and B, and an example of a union set operation.

Figure 16A:
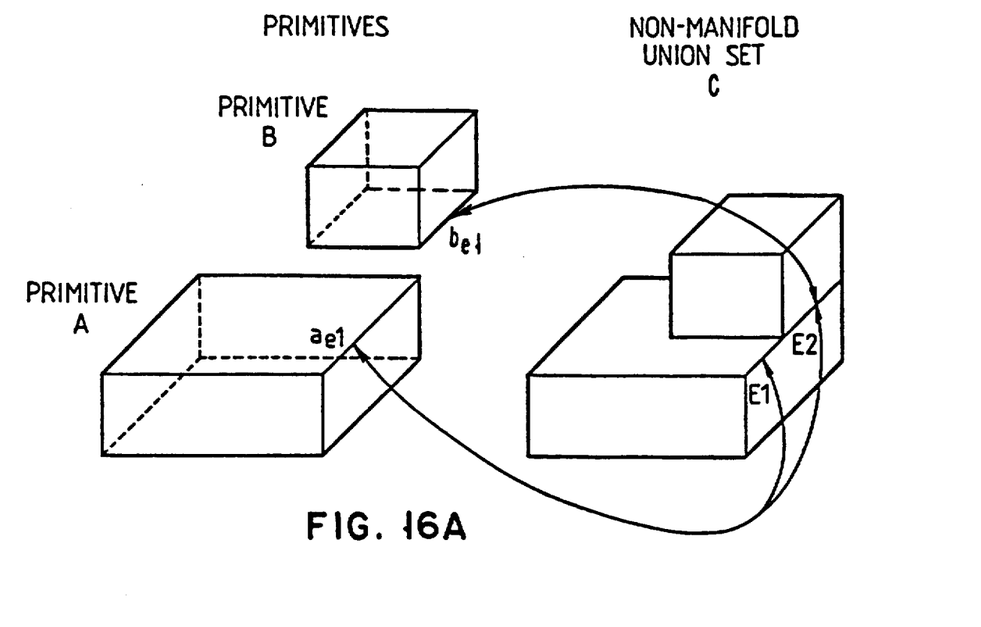
Figure 16B:
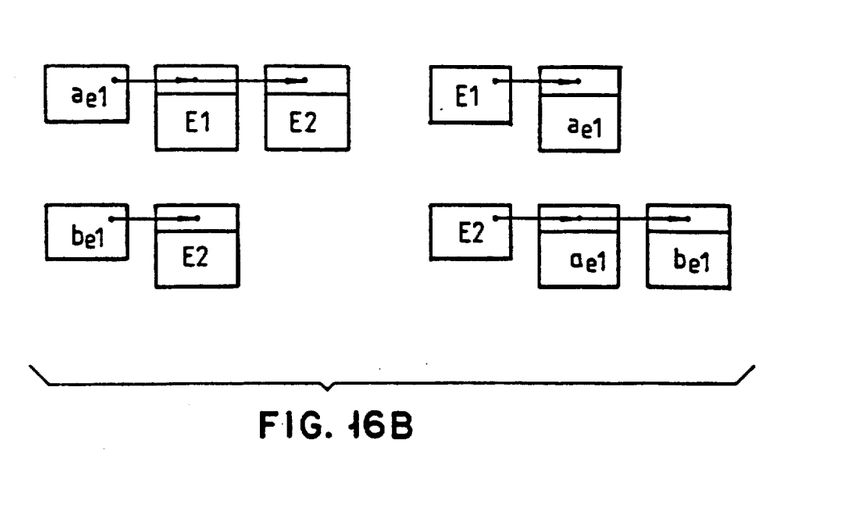

In addition, according to the invention, retention of correspondence is provided between elements in the non-manifold boundary representation data file 7 and primitives in an element correspondence data file 8 (blocks 3 and 22). Here, establishing the correspondence means, as exemplified in FIG. 16 later, that it is possible to specify elements of a non-manifold boundary representation originating from a primitive when it is specified, and to describe which primitive an element in the non-manifold boundary representation originated from when the element is specified.

Set operations include a union set operation, a difference set operation, and an intersection set operation. In all cases, elements to be outputted by using an output device 6 as a result of set operations is a subset of elements in the non-manifold boundary representation data file 7. Boundaries to be outputted as a result of set operations can be extracted from the non-manifold boundary representation data file 7, because for each element data describing whether or not the element belongs to the subset to be outputted are added. A history of set operations is stored in a set operation history data file 9 (blocks 4 and 23). Subsets to be outputted are determined based on the history of the set operations (blocks 5 and 24).

Set operation is reworked by specifying a specific primitive (block 10) and then deleting it. To this end, elements corresponding to the primitive are selected from the non-manifold boundary representation data file 7 by referring to the element correspondence data (block 25) to delete the correspondence (blocks 11 and 26). Then, the elements that no longer have correspondence with any primitive are deleted from the non-manifold boundary representation data file 7 (blocks 12 and 27).

Furthermore, the set operation history data file 9 is modified (blocks 13 and 28), and on the basis of the result modification is performed on the description of a subset of the elements in the non-manifold boundary representation data file constituting boundaries of the set operations (blocks 14 and 29).

BRIEF DESCRIPTION OF THE DRAWINGS

FIGS, 9A, 9B, 9C is a diagram showing an implementation of data structures in the non-manifold boundary representation.

FIGS. 12A-1 and 12A-2 are diagrams illustrating boundaries resulting from the set operation.

FIGS. 16A, 16B and 17A, 7B, 17C are diagrams illustrating correspondence between the elements of a non-manifold union set and primitives.

DESCRIPTION OF THE PREFERRED EMBODIMENTS

In the present invention, a geometric model of a result of set operations is represented by non-manifold boundary representation data, element correspondence data, and set operation history data.

Figure 8A:
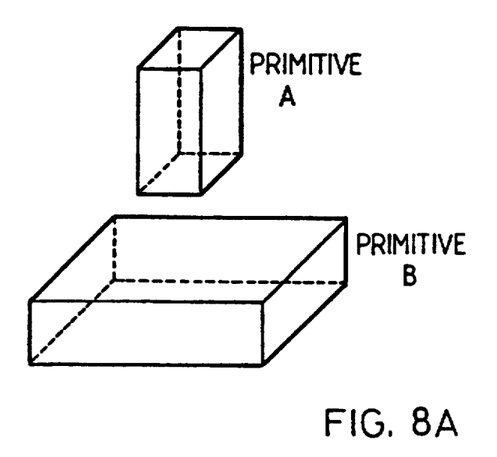
Figure 8B:
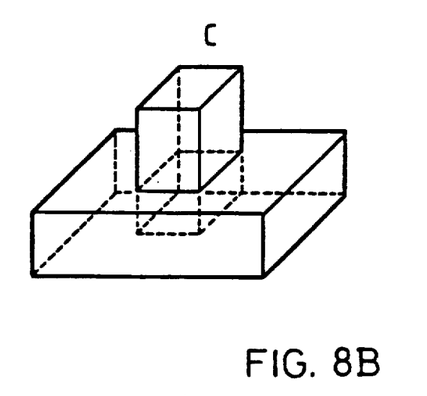

A non-manifold union set of primitives A and B shown in FIG. 8A is represented as a geometric model C shown in FIG. 8B. That is, faces, edges and vertices in a portion common to the primitives A and B (shaded portion in the geometric model C) are retained.

Figure 9A:
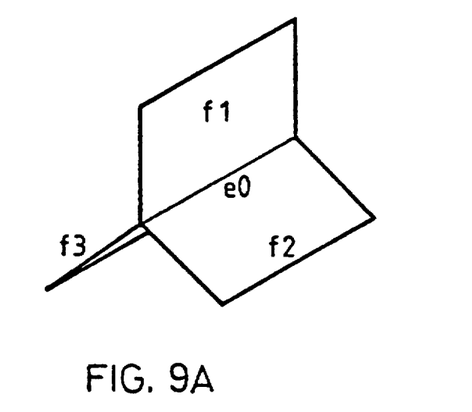
Figure 9B:
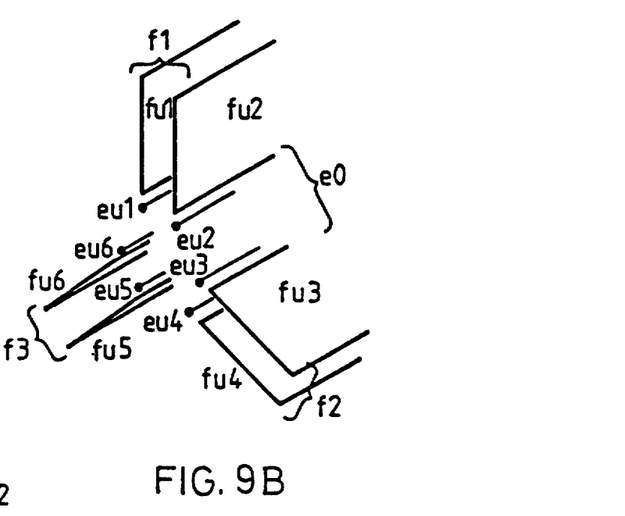
Figure 9C:
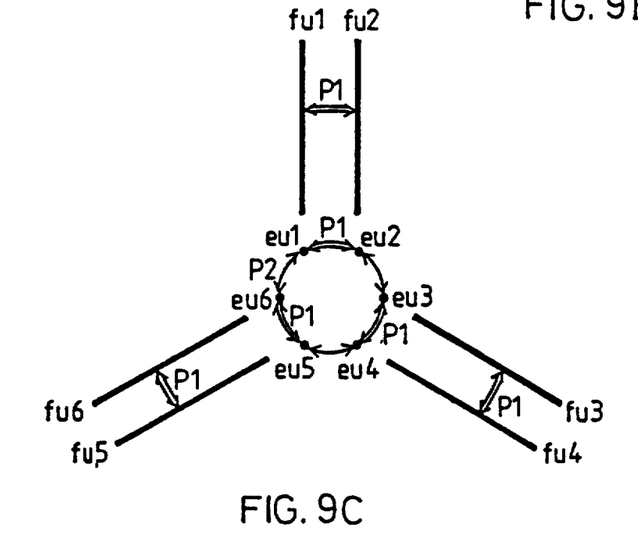

The geometric model of the result of this operation may contain a portion in which one edge is a boundary of three or more faces. Such a geometric model is called a non-manifold. An example of a data structure that can handle boundary data of a non-manifold is disclosed by K. Weiler in "Non-manifold Geometric Modeling38 (Extended Abstract for IFIP 5.2 Workshop on Solid Modeling, 1986). FIGS. 9B and 9C show how to represent a topological structure in which three or more faces contact an edge as shown in FIG. 9A.

In FIGS. 9B and 9C, "fu" is an abbreviation of "face-use," and indicates a face among the elements. "eu" is an abbreviation of "edge-use," and indicates an edge among the elements. It should be noted that six edge-uses (eu1 - eu6) are generated for one edge (for example, e0), and that two face-uses (fu1 and fu2) are generated for one face (for example, f1). In FIG. 9C, P1 is a pointer connecting face-uses and edge-uses of an identical face, while P2 is a pointer connecting edge-uses belonging to face-uses of adjacent faces.

Figure 10:
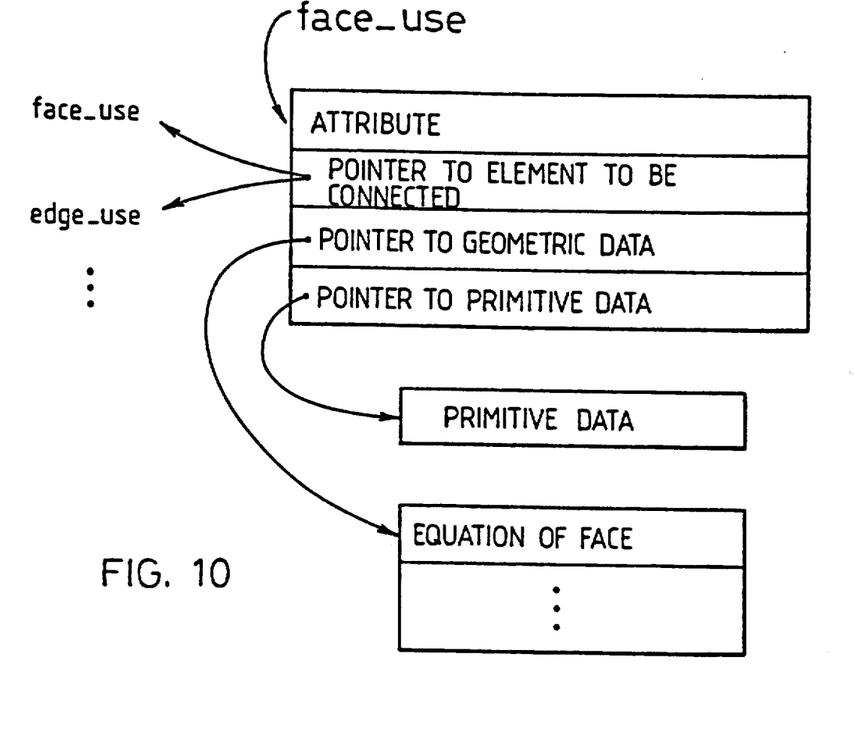
FIG. 10 is a diagram illustrating an element data.

FIG. 10 shows an example of data managed for each element or a data block pointed by one face-use. Attribute data includes color of a face, and a mark indicating that the face is contained in a subset to be outputted. Marking will be described later. A pointer to an element to be connected is a topological data of a non-manifold boundary representation, which describes relations between elements as shown in FIG. 9C. For a face, data of a kind of a curve and an equation of the curve are included as the geometrical data. For a plane, included are data indicating that it is a plane, coordinates of a point on the plane, and data of a normal vector of the plane. Primitive data will be described later. In the present invention, differing from the conventional method, a closed space surrounded by faces (hereinafter simply called a "volume") is managed as an element. A face surrounding the volume is pointed as the element to be connected to the volume. The concept of the volume will be described in more detail later.

The system is provided with the B-rep of primitives in advance.

What are prepared as a primitive to be inputted by a command varies from system to system. Generally, the following data are included:

Regular parallelpiped: Length, width and height are provided.

Pillar: Two-dimensional geometric model and height are provided (a regular parallelpiped may be considered to be a special case of this).

Cone: Two-dimensional model and height are provided.

Sweep geometric model: A two-dimensional geometric model and a vector indicating a direction to move the geometric model, or a curve are provided (a pillar may be considered to be a special case of this).

In case of a solid of revolution, a two-dimensional model and an axis of revolution on its plane are provided.

Sphere: Center and radius are provided.

Figure 11:
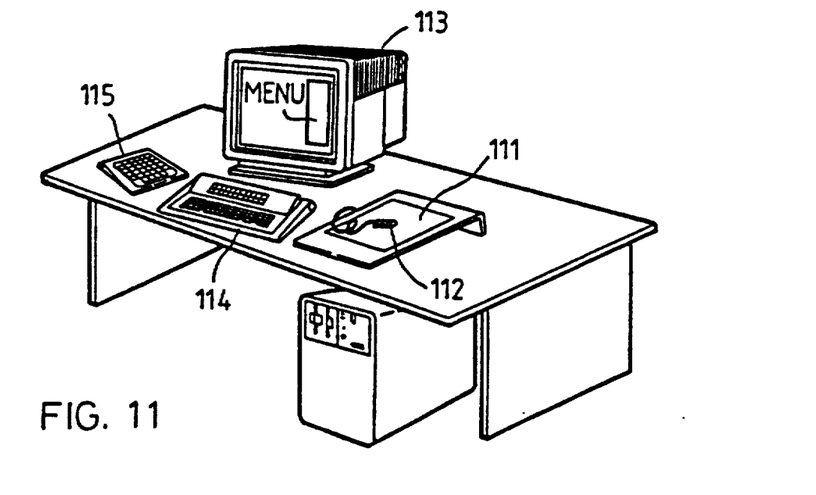
FIG. 11 is a diagram showing an example of input devices.

FIG. 11 shows an example of an input device that is used to specify a kind of set operation, and to input a geometric model.

Specification of a kind of set operations and input of a geometric model may be performed by moving a mouse 112 on a tablet 111, to move a cursor on a screen of a display 113 to select an item from a menu. Alternatively, it may be possible to enter a command through a keyboard 114 or a choice 115 (a programmable function keyboard).

It is necessary to move and position volume models in the preparation for combining basic volumes to build an intended volume. Although there are many possible concrete input methods for entering instructions, one method is to construct a homogeneous coordinate transformation matrix representing three-dimensional rotation and translation thereby converting the internal data. Data to be converted are geometric data on elements (for example, an equation of plane).

Useful input methods include rotation or parallel translation to a coordinates system for the basic volume itself or a coordinates system for a space in which it is placed, as well as, in case where interactive instruction is allowed, rotation or parallel translation using any desired edge or vertex of a polyhedron placed in a space. Instructions to move are similarly provided by using the above-mentioned device.

Update of Geometric Data

Figure 12A:
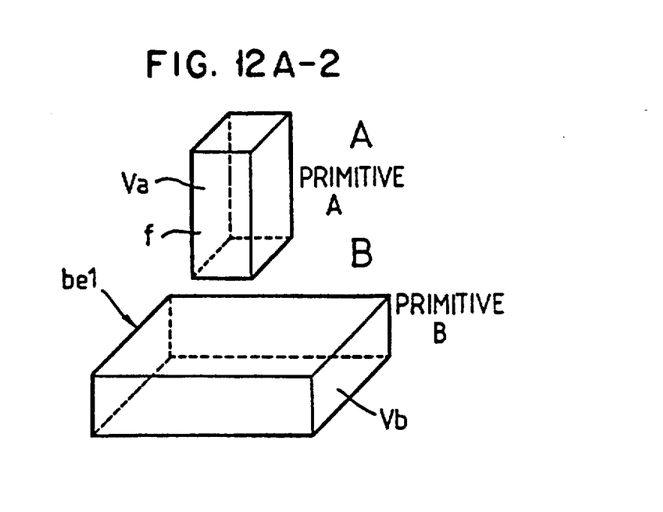
Figure 12A:
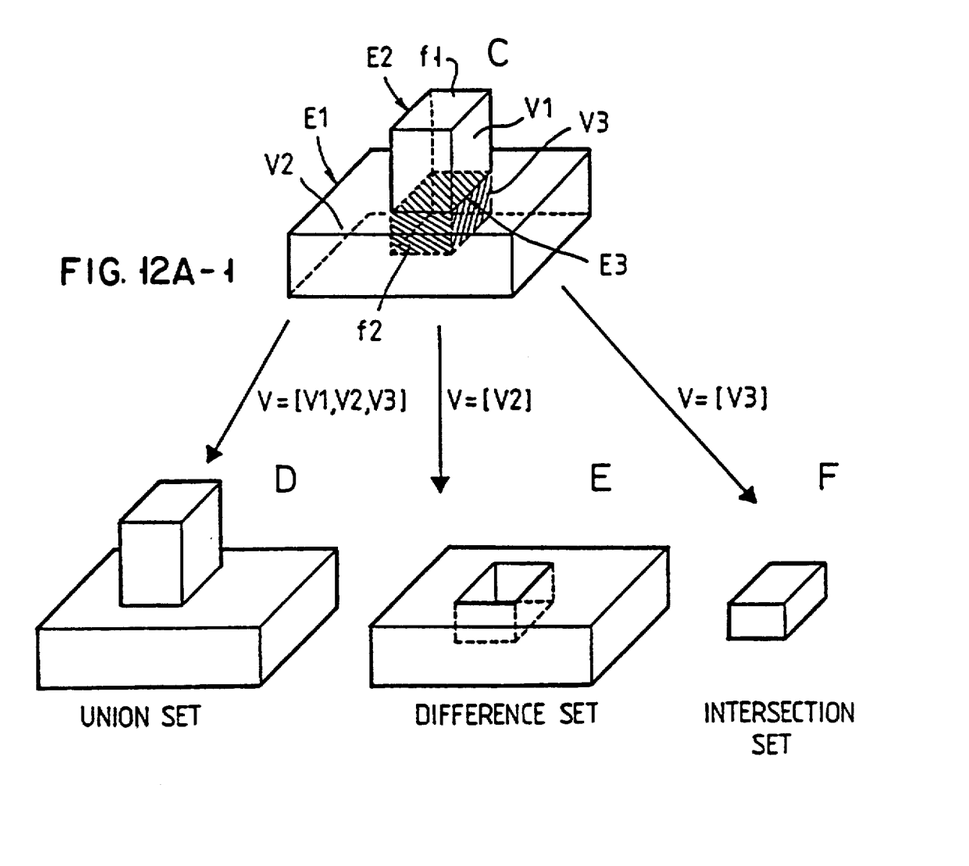

Elements generated as a result of a non-manifold union set operation on primitives A and B shown in FIG. 12A are categorized into the two following categories:

(a) Those newly created by interference between the primitives A and B. The edge E3 in FIG. 12A-1 is an example of these.

(b) Those that are parts of or entire volumes, faces, edges and vertices in the primitive A and/or B. E1 and E2 in FIG. 12A-1 are examples of these.

Figure 13:
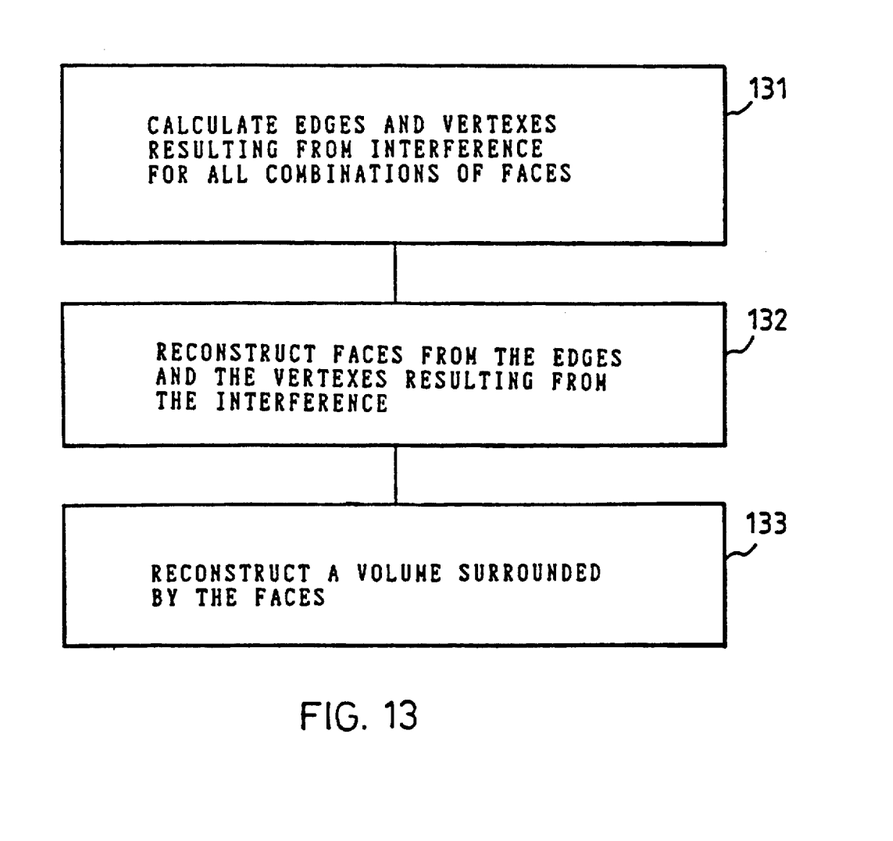
FIG. 13 is a flowchart of the update processing of geometrical data.

FIG. 13 outlines the update of geometric data in a non-manifold union set operation. Elements of the type (a) are processed in step 131, and those of (b) in steps 132 and 133.

Each step is described below.:

Step 131:

First, all edges generated by crossing (interference) between faces are calculated for the combination of all faces of two polyhedrons. To do this, it is necessary to calculate lines of intersection between planes, and points of intersection between edges of the face and the lines of intersection. The edges generated by intersection between the faces can be obtained by sequentially aligning the resultant points of intersection on the line of intersection. A special treatment may be required in a case where a vertex is on another face, or the faces overlap. In such a case, numerical computation is performed, but it addresses problems unique to the numerical computation, such as the determination of whether faces overlap or not.

Step 132:

Faces are reconstructed by taking into consideration edges that are generated by intersection of the faces. The concept of the process to be conducted here is explained by referring to FIG. 14. Through this process faces A and B overlapping each other can be reconstructed into faces C, D and E that do not overlap. An element e is reconstructed into elements e1 and e2 through this process.

The reconstruction of a face is conducted in a known solid modeling system, and therefore its procedure is not described in detail herein.

Step 133:

A volume is reconstructed by taking into consideration the faces reconstructed in the step 132. The process to be conducted here is explained for its concept by referring to FIGS. 12A-1 and 12A-2. Through this process volumes $V_a$ and $V_b$ overlapping each other can be reconstructed into volumes $V_1$, $V_2$ and $V_3$ that do not overlap. Here, $V_3$ is a shaded volume originating from both $V_a$ and $V_b$, $V_1$ is a volume originating from $V_a$ but excluding $V_3$, and $V_2$ is a volume originating from $V_b$ but excluding $V_3$. An element f is reconstructed into elements f1 and f2 through this process.

This operation is the extension of operation in step 132 to three-dimensions.

Update of Topological Data

The topological data is updated based on the result of generation and/or reconstruction of the elements according to the update of geometric data to keep topological consistency. For example, in case a set of one edge and three faces as shown in FIG. 9A is newly generated, pointer data for face-use and edge-use corresponding to them are generated to satisfy the relations of FIG. 9C.

Update of Element Correspondence Data File

The correspondence between elements and primitives in a non-manifold boundary representation is established by linking data blocks for the elements with primitive data with pointers as shown in FIG. 10. Established correspondence between certain elements and a certain primitive is written into the element correspondence data file.

Figures 14, 15:
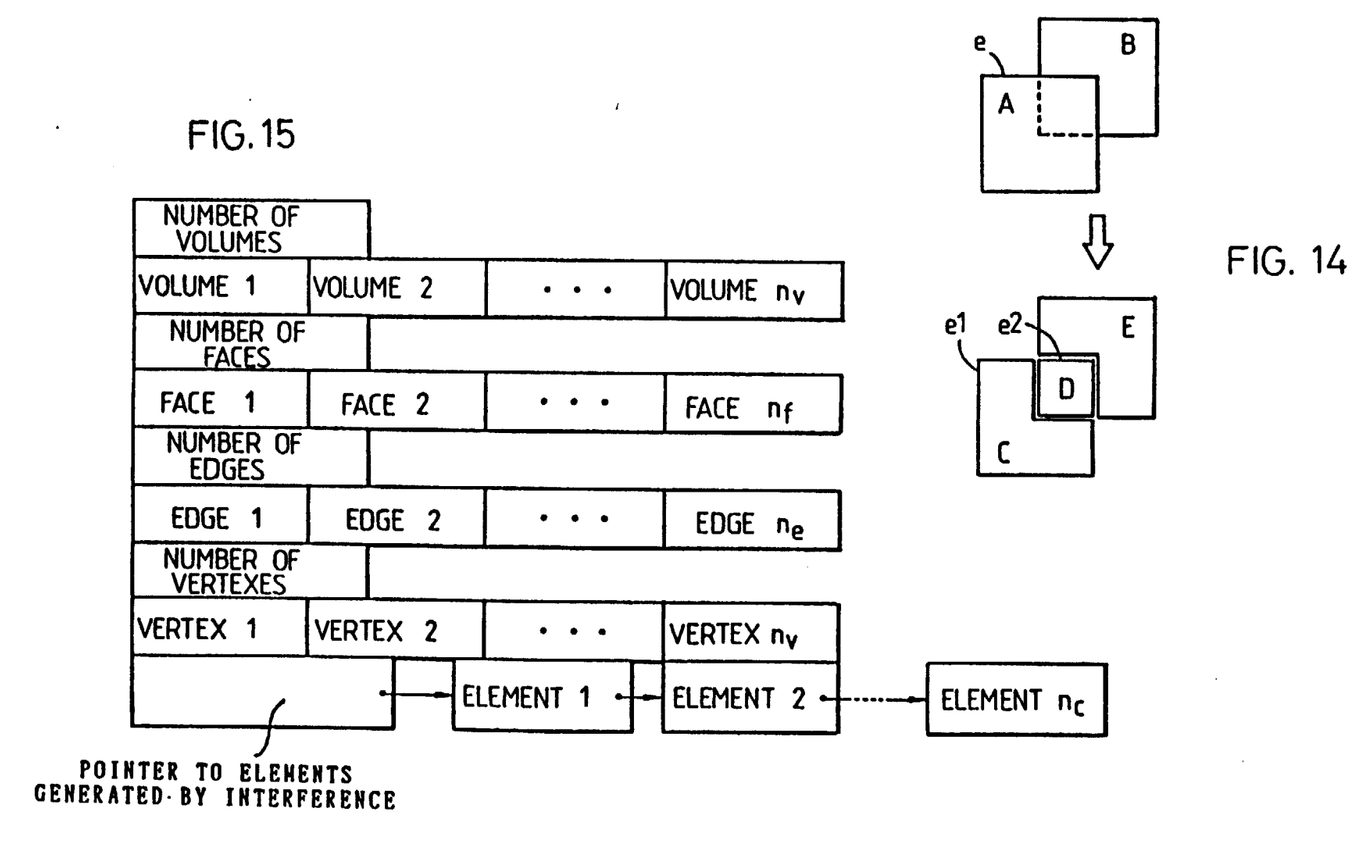
FIG. 14 is a diagram illustrating reconstruction of faces.
FIG. 15 is a diagram showing an example of primitive data structure.

Here, primitive data means, for example, a data structure as indicated in FIG. 15. Whenever a primitive is inputted, such a data structure is generated in the storage device. The primitive data may be represented as a set of elements without any topological structure as indicated in FIG. 15 because it is sufficient to function as an end point of a pointer from the element data block or a start point of a pointer to the element data block. The primitive data may be simplified further than one indicated in FIG. 15.

FIGS. 16A and 16B show an example of correspondence. Assuming that C is a union set of the non-manifold boundary representation of a primitive A and a primitive B, an edge ael of the primitive A corresponds to edges E1 and E2 of the geometric model C, while an edge bel of the primitive B corresponds to the edge E2 of the geometric model C. The correspondence as indicated in FIG. 16B is written into the element correspondence data file 8 (FIG. 1).

Figure 17A:
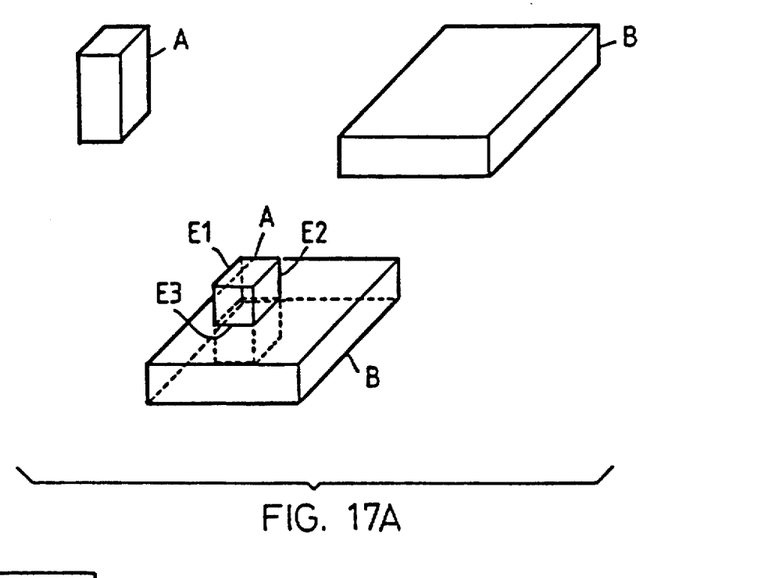
Figure 17B:
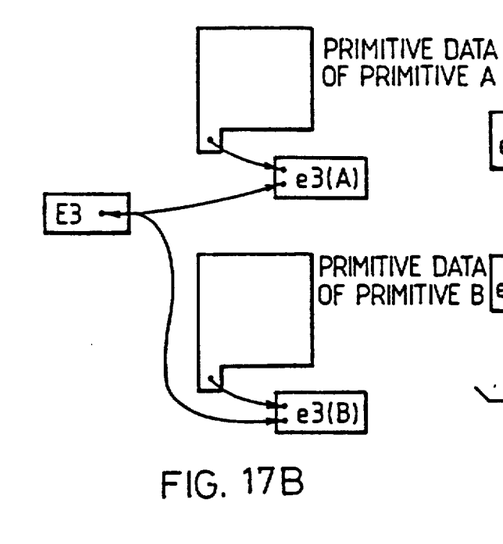
Figure 17C:
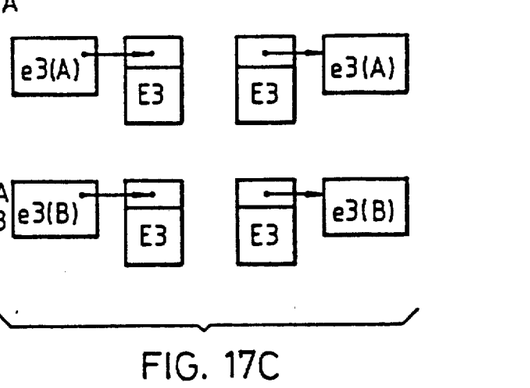

On the other hand, in an example shown in FIG. 17A, an edge E3 does not correspond to any edge of either primitive A or primitive B. When a new element is generated from operating on primitives, elements are added to the primitive data for both primitives as indicated in FIG. 17B to establish correspondence with elements in the non-manifold boundary representation. The correspondence as indicated in FIG. 17C is written into the element correspondence data file 8.

A subject of a set operation may be a geometric model that is defined by set operations on primitives. Now, it is assumed that a geometric model Z is produced when a set operation between a geometric model P and a geometric model Q is conducted. In this case, it is further assumed that an element ez of the geometric model Z is created from an element ep of the geometric model P and an element eq of the geometric model Q, and is represented as:

$$ez = \{ep, eq\} \quad (1)$$

Then, it is assumed that P is created by set operations on primitives A1, ..., An, and Q is created by set operations on primitives B1, B2, ... Bm, and that an element ep of P and an element eq of Q can be expressed as sets of elements of the primitives as follows:

$$ep = \{ea1, \ldots, ean\} \quad (2)$$

$$eq = \{eb1, \ldots, ebm\} \quad (3)$$

Then, because (1) can be expressed from (2) and (3) as follows:

$$ez = \{ea1, \ldots, ean, eb1, \ldots, ebm\},$$

it can be developed to primitives.

Same is true to a case where new elements are generated by interference. If an element generated by interference between the elements ep and eq is expressed as $<ep, eq>$, it can be expressed according to the relation between (2) and (3) as $$\{<ep, eq>\} = \{<eai, ebj>\} \quad (1 \leq i \leq n, 1 \leq j \leq m)$$

and can be developed to primitives.

Update of Set Operation History Data File

Figure 18:
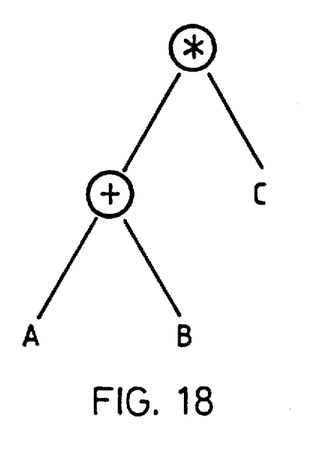
FIGS. 18 and 20 are diagrams showing an example of a set operation history data file structure.

The set operation history is stored in a form of a tree in which data indicating kinds of set operations and data indicating geometric models are arranged. In case where the result of a union operation on primitives A is B is further subject to an intersection operation with primitive C, the set operation history data file stores data as indicated in FIG. 18. In the figure, (+) represents the union operation, while (*) represents the intersection operation.

Marking of Elements to be Outputted

Figure 19:
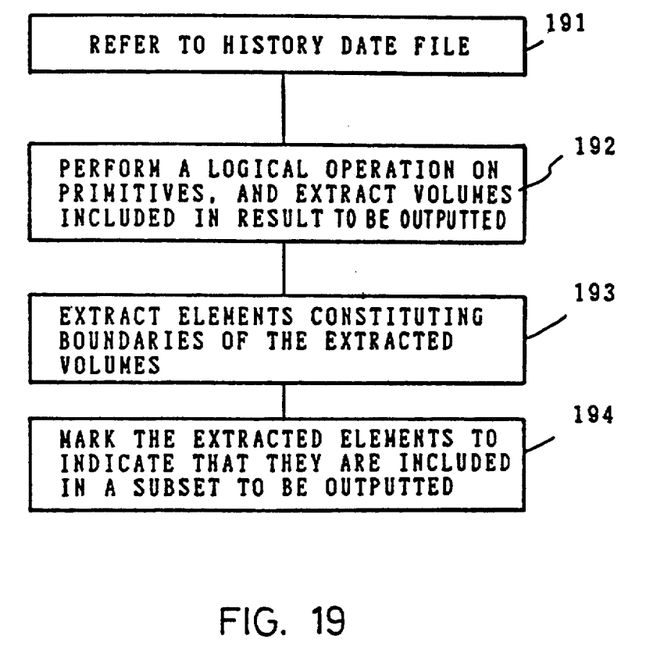
FIG. 19 is a flowchart showing procedure for marking elements to be outputted.

FIG. 19 outlines procedure for marking elements to be outputted.

First, in the step 191, logical operation on primitives is conducted by referring to the set operation history data file.

Figure 12B:
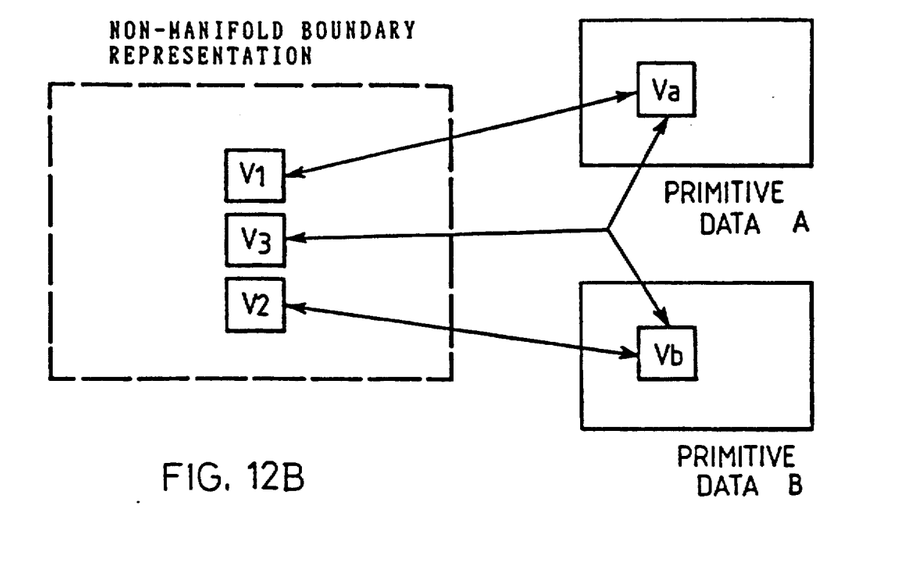
FIG. 12B is a diagram showing correspondence of the volumes in FIG. 12A.

The step 192 is explained by referring to FIG. 12A. In the non-manifold union set operation, the volume elements $V_1$, $V_2$ and $V_3$ are placed in the non-manifold boundary representation data file. The correspondence of these elements with the primitives A and B are recorded in the element correspondence data file. FIG. 12B shows such correspondence. That is, it can be expressed by the following equations:

$$V_a = \{V_1, V_3\}$$

$$V_b = \{V_2, V_3\}ps$$

Now, it is assumed that the result of the logic operation in the step 191 (FIG. 19) is A (+) B, and therefore, a volume $V_d$ of the union set D to be outputted is $\{V_a + V_b\}$. Then, $V_d = \{V_1, V_2, V_3\}$, which can be found by searching for a volume that has correspondence with at least one of $V_a$ and $V_b$.

Similarly, a volume $V_e$ of a difference set E is:

$$V_e = V_b * (-V_a) = \{V_2\}$$

where $-V_a$ is a complement of $V_a$.

It can be found by searching for a volume that has correspondence with $V_b$, but does not have it with volume $V_a$.

A volume $V_f$ of an intersection set F is $V_f = V_a * V_b = \{V_3\}$, which results in finding a volume that has correspondence with both $V_a$ and $V_b$.

After the volume to be outputted is obtained as described, faces surrounding the volume, edges surrounding the faces, and points at each end of the edges are sequentially obtained (step 193).

After a subset of the elements to be outputted is obtained, elements belonging to the subset are given a mark indicating this fact (step 194; see FIG. 10).

A conventional graphics display is used as an output device. To output the result of the set operations, it is sufficient to extract the marked elements from the non-manifold boundary representation data file, and to present a display on the graphics display by using the data relating to the extracted elements. Hidden-line elimination and hidden-surface elimination may be performed, as appropriate, so as not to display unseen portions.

A geometric model is reshaped by eliminating a primitive involved in the set operation to be reworked.

Operations to be conducted to this end are one that eliminates the correspondence of the primitive with the elements of the non-manifold boundary representation, one that deletes the elements having correspondence with the primitive from the non-manifold boundary representation data file, and one that modifies the history of the set operations to modify the boundaries of the result of the set operations.

The device specifying a primitive to be deleted may have the same configuration as that of the input device described above. For example, a user enters a command to delete a primitive that was entered at the fifth input.

Correspondence data relating to the primitive to be deleted is deleted from the element correspondence data file.

At that moment, if there is an element created by interference of the primitive to be deleted with another primitive, the correspondence of the element with the other primitive is also eliminated. This is explained in the example of FIG. 17A. Now, it is assumed that an instruction is given to delete the primitive A.

Then, the correspondence between element E1 and primitive A, and that between element E2 and primitive A are deleted from the element correspondence file. E1 and E2 are originated only from the primitive A, and contained in the non-manifold boundary representation file. In addition, the correspondence data between the element E3, which is originated from both the primitives A and B, and the primitive A, and that between E3 and the primitive B are also deleted from the element correspondence data file.

First, data relating to the elements that no longer have the correspondence with any primitive are deleted from the non-manifold representation data file. Therefore, in case where, in the example of FIG. 17A, it is instructed to delete the primitive A, the elements E1, E2, E3 and so on are deleted from the non-manifold representation data file.

Because several elements of the non-manifold union set are deleted, the edges, the faces and the volumes are reconstructed. This is processing similar to that performed in the steps 132 and 133 of FIG. 13.

After the geometrical data is updated as described above, the topological data is also updated in a manner similar to the above-mentioned processing.

Figure 20:
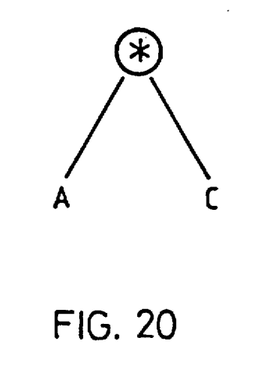

Data on the deleted geometric model and the kind of the set operation on that geometric model are deleted from the set operation history data file. If it is instructed to delete the primitive B in the example shown in FIG. 18, the result of the update of the set operation history data file becomes that as shown in FIG. 20.

Marking is performed by the method as described above.

Figure 21:
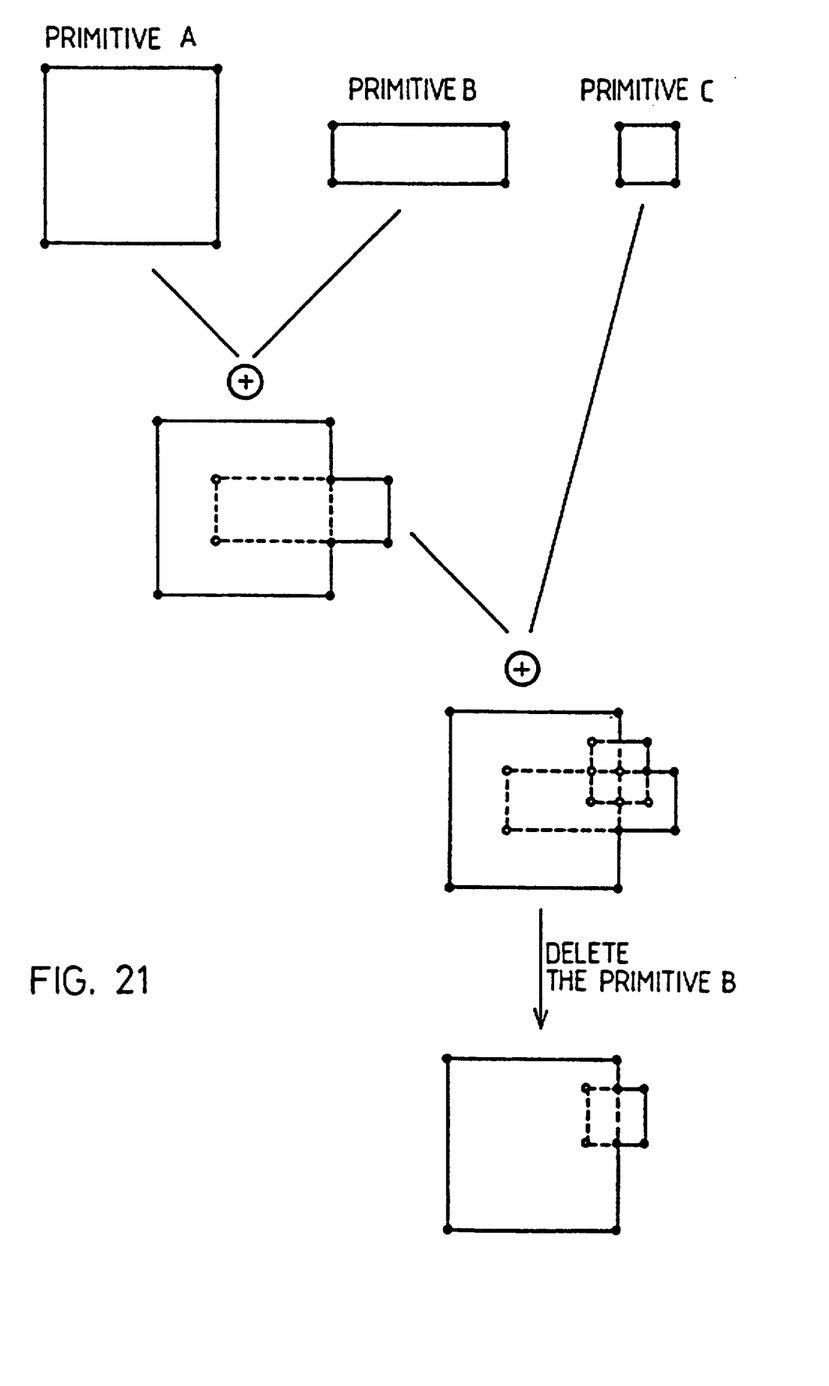
FIG. 21 is a diagram illustrating an example of reworking of a set operation.

FIG. 21 schematically shows for two-dimensional primitives the manner in which a set operation conducted at any time can be easily reworked according to the procedure described above. In the figure, elements to be outputted from the non-manifold union set are indicated by black points and solid lines, while those not to be outputted are indicated by white points and broken lines. It shows the manner in which elements constituting the union set A (+) C are outputted as a result of an instruction to delete the primitive B after performing the set operation (A (+) B) (+) C.

The above-described procedure according to the present invention makes it possible to rework set operations. According to this method, the work of modifying a data file in response to reworking of set operations does not depend on the order of the set operations, so that set operations can be quickly reworked at any time.

This invention provides a technique that makes it possible to make a modification independently of the order of set operations. The invention is advantageous in the modification of a solid model because it does not require recalculation of the set operations not relating to the modification as is necessary with the conventional requiring an enormous amount of calculations in which a new geometric model is reconstructed all over again while keeping and referring to the CSG representation, or in which the preceding geometric models are sequentially recovered by backtracking the operation history. Therefore, calculation time for modification is reduced significantly.

Having thus described our invention, what we claim as new, and desire to secure by Letters Patent is:

1. A computer system for displaying representations of solid objects comprising:
    a computer memory for storing a plurality of component geometric models, each component geometric model comprising one of more boundary elements;
    a computer input means for specifying one or more of a union operation, a difference operation, or an intersection operation for combining at least two component geometric models to form a combined geometric model;
    a computer processor for performing the specified operation on the component geometric models to generate the combined geometric model, said processor identifying all component geometric models in the combined geometric model, said processor dividing the combined geometric model into segments where each segment and all component geometric models containing the segment intersect at an intersection equal to the segment, said processor generating one of more boundary elements for each segment, said processor identifying one or more external boundary elements of the combined geometric model as output boundary elements;
    a computer memory for storing, for each boundary element of a segment, an identification of the component models containing the segment, said computer memory also storing
        [a] an identification of the boundary elements of the segments contained in each component model;
        [b] an identification of the segment boundary elements which are output boundary elements;
        [c] an identification of all component models contained in the combined geometric model; and
        [d] an identification of all combining operations performed on the identified component models;
    and
    a computer readout and display means for reading from said computer memory and displaying said segment boundary elements identified as output boundary elements of the combined geometric model such that the displaying of the output boundary elements displays the representation of a solid object.

2. A computer system as claimed in claim 1, wherein the boundary elements comprise one or more of an edge, a face, and an enclosed volume.

3. A computer system as claimed in claim 2, wherein the computer memories each further store geometric and topological data for each boundary element.

* * * * *